United States Patent [19]

Ringwall

[11] 3,857,412

[45] Dec. 31, 1974

[54] NOTCH TRACKING FLUIDIC FREQUENCY FILTER

[75] Inventor: Carl G. Ringwall, Scotia, N.Y.

[73] Assignee: The United States of America as represented by the Secretary of the Army, Washington, D.C.

[22] Filed: July 12, 1973

[21] Appl. No.: 378,486

[52] U.S. Cl. ............ 137/814, 235/200 PF, 137/826
[51] Int. Cl. ............................................ F15c 1/14
[58] Field of Search .......... 137/814, 815, 819, 820, 137/821, 826; 235/200 PF, 201 PF

[56] References Cited

UNITED STATES PATENTS

| | | | |
|---|---|---|---|
| 3,451,410 | 6/1969 | Boothe | 137/819 |
| 3,468,328 | 9/1969 | Metzgel | 137/815 |
| 3,488,948 | 1/1970 | Cornett | 137/819 |
| 3,494,371 | 2/1970 | Thiry | 235/200 PF X |
| 3,503,423 | 3/1970 | Edell | 235/200 PF X |
| 3,530,870 | 9/1970 | Hoglund | 235/200 PF X |
| 3,556,121 | 1/1971 | Urbanosky | 235/200 PF X |

*Primary Examiner*—William R. Cline
*Attorney, Agent, or Firm*—Edward J. Kelly; Herbert Berl; Aubrey J. Dunn

[57] ABSTRACT

A fluidic system having three parallel paths sensitive to the input frequency applied in parallel to the paths. The first path consists of one or more fluidic amplifiers providing an overall gain g and some degree of isolation between frequency sensitive networks. The second path is a proportional gain path and may range from a resistance attenuation network to one or more fluidic amplifiers depending on the desired damping factor. The third path consists of one or more fluidic amplifiers and has a gain *kg*. Both the first and third paths have overall transfer functions which can be expressed in terms of simple cascaded lag time constants. In addition, a fluidic phase discriminator monitors the phase shift of the signal across the network and continually adjusts the gain of one path to maintain zero phase shift across the network.

10 Claims, 2 Drawing Figures

PATENTED DEC 31 1974 3,857,412

NOTCH TRACKING FLUIDIC FREQUENCY FILTER

SUMMARY OF THE INVENTION

The invention is a fluid frequency filter having three parallel fluidic paths. The paths have a common input and a common output. The first path has one or more fluidic amplifiers providing an overall gain *g* and some degree of isolation between frequencies sensitive networks. The second path is a proportional gain path and may range from a resistance attenuation network to one or more fluidic amplifiers depending on the desired damping factor. The third path consists of one or more fluidic amplifiers. This path has a gain *kg* wherein *k* represents the ratio of gain in this path to the gain in the first path. Also, a fluidic phase discriminator monitors the phase shift of the signal across the network and continually adjusts the gain of one path to maintain zero phase shift across the network.

DETAILED DESCRIPTION OF THE INVENTION

Figures 1, 2:
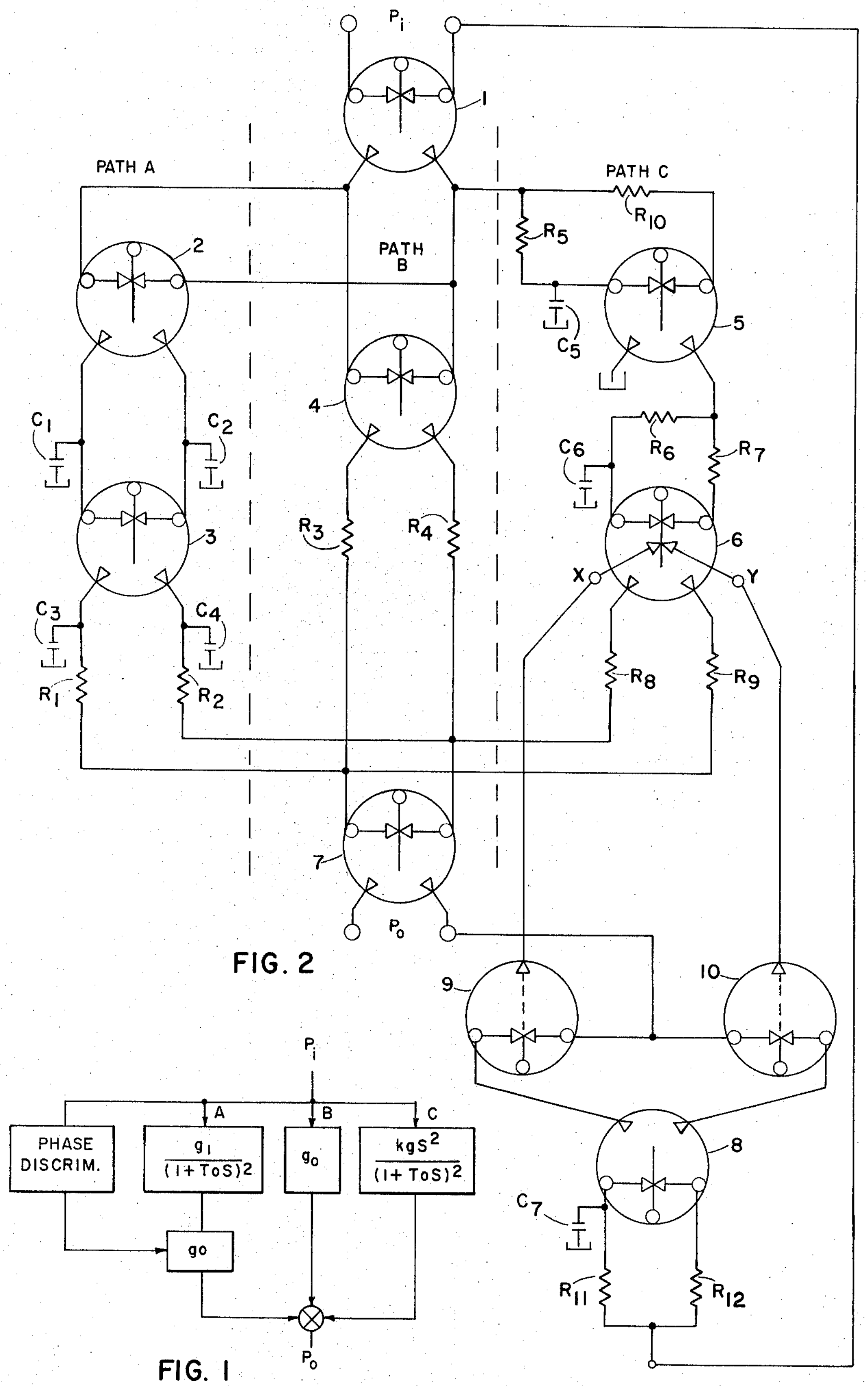
FIG. 1 is a functional block diagram of the invention.
FIG. 2 is a schematic diagram of the invention.

The invention may be best understood by reference to the drawings. FIG. 1, for example, shows paths A, B and C having the transfer functions as shown. Path A consists of one or more fluidic amplifiers providing an overall gain *g* and preferably some degree of isolation between two frequency sensitive networks so that the overall transfer function can be expressed in terms of simple cascaded lag time constants. Path B is a proportional gain path. This path may range from a resistance attenuation network to one or more fluidic amplifiers depending on the desired damping factor. Path C consists of one or more fluidic amplifiers. This path has a gain *kg* wherein *k* represents the ratio of gain in path C to the gain in path A. The amplifiers and input networks in this path form cascaded derivative networks followed by a lag time constant equal to the lag time constant in path A. The overall transfer function between input $P_i$ and output $P_o$ is $$\frac{P_o}{P_i} = \frac{(g + g_o)\left[1 + 2\frac{T_o\, g_o\, S}{(g + g_o)} + \frac{(gk + g_o T_o^2) S^2}{g + g_o}\right]}{1 + 2\, T_o\, S + T_o^2\, S} \qquad [1]$$

The general characteristics can be highlighted by assuming $g_o$ = zero and assuming symmetrical gain characteristics on either side of the notch, i.e., $g = gk/T_o^2$.

$$P_o/P_i = (g\,[1 + T_o^2\, S^2])/(1 + 2\, T_o\, S + T_o^2\, S^2) \qquad 2.$$

The quadratic in the denominator is heavily damped and contributes to the total gain and phase shift but has negligible effects on the rate of change of gain and phase shift at the resonant frequency $$\omega = 1/T_o.$$

The numerator has zero damping hence the gain goes to zero at resonance. This characteristic can be obtained with practical circuits in that zero gain requires that two counter rotating vectors be generated and that they be equal in magnitude and 180° out-of-phase at the desired reference frequency.

From Equation [1] it is obvious that to obtain a low damping factor $$g_o/g + g_o << 1$$

and the transfer function can be approximated by $$\frac{P_o}{P_i} = \frac{g\left[1 + \frac{2\, T_o g_o}{g}\, S + k^2 S^2\right]}{1 + \frac{2S}{\omega_o} + \frac{S^2}{\omega_{o2}}}$$

Transfer function [3] shows that the resonant frequency can be varied by changing *k* or the relative gains between paths A and C. The damping factor can be made directly proportional to $g_o$ or the gain in the proportional path. A fluidic phase discriminator monitors the phase shift of the signal across the network and continually adjusts the gain of one path to maintain zero phase shift across the network.

FIG. 2 shows a more detailed diagram of the block diagram shown in FIG. 1. Amplifier 1 is a buffer amplifier which takes a push-pull input signal applied at $P_i$, amplifies it, and supplys a bipolar common fluidic signal input for the three parallel paths. Path A is made up of two cascaded amplifiers 2 and 3. These amplifiers provide an overall gain g and in addition 2 provides isolation between the two lag networks composed of fluidic capacities $C_1$, $C_2$, $C_3$, and $C_4$, and output impedances $R_1$ and $R_3$.

Path B consists of a single proportional amplifier 4 and its output impedances $R_3$ and $R_4$. In applications requiring very low damping factors, this amplifier is not required. Path C is made up of amplifiers 5 and 6, with the control ports of 5 connected through resistors to one pole of the output of amplifier 1. Each amplifier together with the fluidic capacitors $C_5$ and $C_6$ and resistors $R_5$ through $R_{10}$ forms a derivative network followed by a time lag constant. Amplifier 6 is a variable gain amplifier. Notch tracking is accomplished with pressure applied to control ports X and Y. The input $P_i$ applied to amplifier 1 is also applied as an input to amplifier 8. The signal is phase shifted (approximately 90°), and amplified by amplifier 8 and its associated input network including $R_{12}$, $R_{11}$, and $C_7$. The output of 8 is then applied to one control port of fluidic rectifiers 9 and 10. The output $P_o$ of amplifier 7 is applied to the other control ports of rectifiers 9 and 10. If the phase shift between the signal at the other ports and the output of 8 is 90°, then the differential control pressures across rectifiers 9 and 10 are equal. The output pressures of the two rectifiers are then equal and the two differential pressures applied across the variable gain control ports X and Y is zero. A phase shift other than 90° will give either positive or negative pressure differentials across X and Y (polarity depends on direction of phase shift). This pressure differential is used to change the gain of the variable gain amplifier in such a direction that the phase shift between $P_o$ and $P_i$ is reduced to zero. This essentially slaves the notch frequency to the input frequency. A variable damping factor can be provided by using a variable gain amplifier substituted for amplifier 4. The outputs of the three paths are summed in amplifier 7.

It should be understood that a pressure source (not shown) provides fluid to the power jets of amplifiers 1–7. As can be seen on FIG. 2, one output of amplifier 5 is returned to the sump of the pressure source.

Typical values of the various resistors and capacitors of my invention are as follows:

| Element | Value | Units |
|---|---|---|
| $R_1$ | $10^5$ | sec/in² |
| $R_2$ | $10^5$ | sec/in² |
| $R_3$ | $2 \times 10^5$ | sec/in² |
| $R_4$ | $2 \times 10^5$ | sec/in² |
| $R_5$ | $5 \times 10^4$ | sec/in² |
| $R_6$ | $5 \times 10^4$ | sec/in² |
| $R_7$ | $5 \times 10^4$ | sec/in² |
| $R_8$ | $10^5$ | sec/in² |
| $R_9$ | $10^5$ | sec/in² |
| $R_{10}$ | $5 \times 10^4$ | sec/in² |
| $R_{11}$ | $10^5$ | sec/in² |
| $R_{12}$ | $10^5$ | sec/in² |
| $C_1$ | $2 \times 10^{-7}$ | in² |
| $C_2$ | $2 \times 10^{-7}$ | in² |
| $C_3$ | $2 \times 10^{-7}$ | in² |
| $C_4$ | $2 \times 10^{-7}$ | in² |
| $C_5$ | $5 \times 10^{-8}$ | in² |
| $C_6$ | $5 \times 10^{-8}$ | in² |
| $C_7$ | $5 \times 10^{-8}$ | in² |

While a particular embodiment of the invention has been shown and described, other embodiments may be obvious to one skilled in the art in view of the instant disclosure.

I claim:

1. A notch tracking fluidic frequency filter including first, second, and third parallel fluid paths having a common bipolar fluidic signal input; a fluidic output summer for said fluid paths; said first fluid path including fluidic means for introducing a time lag to signals on said input; said second fluid path including fluidic means for providing a proportional gain to signals on said fluidic input; and said third fluid path including fluidic means for introducing a time lag and a gain $k$ to signals on said fluidic input whereby $k$ is greater than 1; and a fluidic phase discriminator having fluid control inputs and a fluid output, with said control fluid inputs connected to said common fluidic signal input and said fluidic output summer and said fluid output connected to said means in said third path.

2. The fluidic filter as defined in claim 1 wherein said first fluid path includes first and second fluidic amplifiers, each having a fluid power jet, fluid control jets, and fluid output ports, with said control jets of said first amplifier connected to the poles of said common fluidic signal input; first fluidic means connecting said output ports of said first amplifier to said control jets of said second amplifier; and second fluidic means connecting said output ports of said second fluidic amplifier to said fluidic output summer.

3. The filter as defined in claim 2 wherein said first fluidic means connecting comprises fluidic capacitors; and said fluidic second means connecting comprises series-connected fluidic capacitors and resistors.

4. The fluid filter as defined in claim 3 wherein said second fluid path includes at least a third fluidic amplifier.

5. The fluidic filter as defined in claim 3 wherein said second fluid path includes fluidic resistive means.

6. The fluidic filter as defined in claim 5 wherein said third fluid path includes fourth and fifth fluidic amplifiers, each having a power jet, control jets, and output ports, said fourth amplifier having two fluid control jets; third fluidic means connecting said control jets of said fourth fluidic amplifier to one pole of said common fluidic signal input; fourth fluidic means connecting one of the fluid output ports of said fourth fluidic amplifier to fluid control jets of said fifth fluidic amplifier, the other fluid output ports of said fifth fluidic amplifier being dumped to fluidic system sump; and fifth fluidic means connecting said output fluid ports of said fifth fluidic amplifier to said fluidic output summer.

7. The fluidic filter as defined in claim 6 wherein said third fluidic means connecting includes a series connected fluidic resistor and a fluidic capacitor connected between said one pole of said common fluidic signal input and one control jet of said fourth fluidic amplifier and further including another fluidic resistor connected between said common fluidic signal input and the other control jet of said fourth fluidic amplifier.

8. The fluidic filter as defined in claim 6 wherein said fourth fluidic means connecting includes a series connected fluidic resistor and fluidic capacitor connected between one output port of said fourth amplifier and one control jet of said fifth fluidic amplifier and further including another fluidic resistor connected between said one output port of said fourth fluidic amplifier and the other control jet of said fifth fluidic amplifier.

9. The fluidic filter as defined in claim 6 wherein said fluidic phase discriminator includes first and second fluidic rectifiers each having a power jet, first and second control jets, and an output port; and sixth fluidic means connecting said first pole of said common fluidic signal input to said first control jets of said fluidic rectifiers; with said second control jets of said fluidic rectifiers connected to the output port of said fluidic output summer; and said output ports of said fluidic rectifiers connected to input ports of said fifth amplifier.

10. The fluidic filter as defined in claim 9 wherein said sixth fluidic means connecting includes a seventh fluidic amplifier having first and second control jets, a power jet, and first and second output ports, with the series connection of a fluidic resistor and a fluidic capacitor between said one pole of said common fluidic signal input and said first control jet of said seventh fluidic amplifier, a fluidic resistor connected between said one pole of said common fluidic signal input and said second control jet of said seventh fluidic amplifier, and wherein said output ports of said seventh fluidic amplifier are respectively connected to said first control jets of said fluidic rectifiers.

* * * * *